United States Patent
Yi et al.

(10) Patent No.: US 10,667,165 B2
(45) Date of Patent: *May 26, 2020

(54) METHOD AND DEVICE FOR TRANSMITTING DATA UNIT

(71) Applicant: LG Electronics Inc., Seoul (KR)

(72) Inventors: Seungjune Yi, Seoul (KR); Sunyoung Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/429,578

(22) Filed: Jun. 3, 2019

(65) Prior Publication Data

US 2019/0289489 A1 Sep. 19, 2019

Related U.S. Application Data

(63) Continuation of application No. 16/064,826, filed as application No. PCT/KR2018/001053 on Jan. 24, 2018.

(Continued)

(51) Int. Cl.
*H04W 28/02* (2009.01)
*H04L 1/18* (2006.01)
(Continued)

(52) U.S. Cl.
CPC ......... *H04W 28/0205* (2013.01); *H04L 1/189* (2013.01); *H04W 76/15* (2018.02);
(Continued)

(58) Field of Classification Search
CPC .... H04W 28/0205; H04W 80/02; H04L 1/189
See application file for complete search history.

(56) References Cited

U.S. PATENT DOCUMENTS

2007/0140491 A1 6/2007 Yi
2012/0057560 A1* 3/2012 Park .................... H04L 1/08
370/329

(Continued)

FOREIGN PATENT DOCUMENTS

| KR | 1020070121505 | 12/2007 |
| KR | 1020140102115 | 8/2014 |
| WO | WO2013173957 | 11/2013 |

OTHER PUBLICATIONS

Huawei, HiSilicon, "Support for ultra-reliable low latency communication (URLLC)," R2-166989, 3GPP TSG-RAN2 Meeting #95bis, Kaohsiung, Oct. 10-14, 2016, 3 pages.

(Continued)

*Primary Examiner* — Rina C Pancholi
(74) *Attorney, Agent, or Firm* — Fish & Richardson P.C.

(57) ABSTRACT

In the present invention, if a transmitting device receives an activation command for a packet duplication function of a PDCP entity for a radio bearer (RB), the PDCP entity submits a PDCP protocol data unit (PDU) to each of multiple lower layer entities associated with the PDCP entity, and each of the multiple lower layer entities transmits the PDCP PDU. If the transmitting device receives a deactivation command for the packet duplication function, the PDCP entity submits the PDCP PDU to a single one of the multiple lower layer entities, and the single one of the multiple lower layer entities transmits the PDCP PDU.

20 Claims, 12 Drawing Sheets

Related U.S. Application Data

(60) Provisional application No. 62/453,533, filed on Feb. 2, 2017.

(51) Int. Cl.
*H04W 76/15* (2018.01)
*H04W 80/02* (2009.01)

(52) U.S. Cl.
CPC ............. *H04W 80/02* (2013.01); *Y02D 70/00* (2018.01); *Y02D 70/10* (2018.01); *Y02D 70/12* (2018.01); *Y02D 70/126* (2018.01); *Y02D 70/1224* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/146* (2018.01); *Y02D 70/21* (2018.01); *Y02D 70/23* (2018.01)

(56) References Cited

U.S. PATENT DOCUMENTS

| | | |
|---|---|---|
| 2013/0003688 A1 | 1/2013 | Wu |
| 2013/0242859 A1 | 9/2013 | Celik et al. |
| 2013/0329583 A1* | 12/2013 | Vrzic .................... H04W 36/30 370/252 |
| 2016/0234714 A1* | 8/2016 | Basu Mallick ..... H04W 28/085 |
| 2016/0278138 A1 | 9/2016 | Cheng et al. |
| 2018/0279169 A1* | 9/2018 | Wang .................... H04L 1/1809 |
| 2019/0289489 A1 | 9/2019 | Yi et al. |

OTHER PUBLICATIONS

Huawei, HiSilicon, "Support of Multi-Connectivity in NR," R2-167583, 3GPP TSG-RAN WG2 Meeting #96, Reno, USA, Nov. 14-18, 2016, 5 pages.
PCT International Search Report and Written Opinion in International Application No. PCT/KR2018/001053, dated May 11, 2018, 10 pages.
United States Notice of Allowance in U.S. Appl. No. 16/064,826, dated Mar. 5, 2020, 6 pages.

* cited by examiner (a) Control-Plane Protocol Stack (b) User-Plane Protocol Stack (a)

(b)

METHOD AND DEVICE FOR TRANSMITTING DATA UNIT

CROSS-REFERENCE TO RELATED APPLICATIONS

This application is a continuation of U.S. application Ser. No. 16/064,826, filed on Jun. 21, 2018, which is a National Stage application under 35 U.S.C. § 371 of International Application No. PCT/KR2018/001053, filed on Jan. 24, 2018, which claims the benefit of U.S. Provisional Application No. 62/453,533, filed on Feb. 2, 2017. The disclosures of the prior applications are incorporated by reference in their entirety.

TECHNICAL FIELD

The present invention relates to a wireless communication system, and more particularly, to a method for transmitting data units and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARM)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of transmitting, by a transmitting device, a data unit in a wireless communication system. The method comprises: receiving, by the transmitting device, radio bearer (RB) configuration information for a RB, the RB configuration information including configuration information for a packet data convergence protocol (PDCP) entity and multiple lower layer entities associated with the PDCP entity. If receiving, by the transmitting device, an activation command for a packet duplication function of the PDCP entity for the RB, the method comprises: submitting, at the PDCP entity, a PDCP protocol data unit (PDU) to each of the multiple lower layer entities; and transmitting, by each of the multiple lower layer entities, the PDCP PDU. If receiving, by the transmitting device, a deactivation command for the packet duplication function, the method comprises: submitting, at the PDCP entity, the PDCP PDU to a single one of the multiple lower layer entities; and transmitting, by the single one of the multiple lower layer entities, the PDCP PDU.

In another aspect of the present invention, provided herein is a method of transmitting, by a transmitting device, a data unit in a wireless communication system. The method comprises: receiving, by the transmitting device, radio bearer (RB) configuration information for a RB, the RB configuration information including configuration information for a packet data convergence protocol (PDCP) entity and multiple lower layer entities associated with the PDCP entity; receiving, by the transmitting device, a command indicating to which lower layer entity the PDCP entity submits PDCP protocol data units (PDUs); submitting, at the PDCP entity, a PDCP PDU to each lower layer entity indicated by the command; and transmitting, by each lower layer entity to which the PDCP PDU is submitted, the PDCP PDU.

In a further aspect of the present invention, provided herein is a transmitting device for transmitting a data unit in a wireless communication system. The transmitting device comprises a radio frequency (RF) unit, and a processor configured to control the RF unit. The processor is configured to: control the RF unit to receive radio bearer (RB) configuration information for a RB, the RB configuration information including configuration information for a packet data convergence protocol (PDCP) entity and multiple lower layer entities associated with the PDCP entity. If the transmitting device receives an activation command for a packet duplication function of the PDCP entity for the RB, the processor is configured to: submit, at the PDCP entity, a PDCP protocol data unit (PDU) to each of the multiple lower layer entities; and control the RF unit to transmit, from each of the multiple lower layer entities, the PDCP PDU. If the transmitting device receives a deactivation command for the packet duplication function, the processor is configured to: submit, at the PDCP entity, the PDCP PDU to a single one of the multiple lower layer entities; and control the RF unit to transmit, from the single one of the multiple lower layer entities, he PDCP PDU.

In a still further aspect of the present invention, provided herein is a transmitting device for transmitting a data unit in a wireless communication system. The transmitting device comprises a radio frequency (RF) unit, and a processor configured to control the RF unit. The processor is configured to: control the RF unit to radio bearer (RB) configuration information for a RB, the RB configuration information including configuration information for a packet data convergence protocol (PDCP) entity and multiple lower layer entities associated with the PDCP entity; control the RF unit to receive a command indicating to which lower layer entity the PDCP entity submits PDCP protocol data units (PDUs); submit, at the PDCP entity, a PDCP PDU to each lower layer entity indicated by the command; and control the RF unit to transmit, from each lower layer entity to which the PDCP PDU is submitted, the PDCP PDU.

In each aspect of the present invention, the transmitting device may be a user equipment or a base station In each aspect of the present invention, the activation or deactivation command may be received from a receiving device.

In each aspect of the present invention, the receiving device may be a base station or another user equipment In each aspect of the present invention, the RB configuration information may include information indicating to which lower layer entity the PDCP entity transmits the PDCP PDU. The PDCP entity may submit the PDCP PDU to only the lower layer entity indicated by the information.

In each aspect of the present invention, the activation command may include information indicating to which lower layer entity the PDCP entity transmits the PDCP PDU. The PDCP entity may submit the PDCP PDU to only the lower layer entity indicated by the activation command.

In each aspect of the present invention, the deactivation command may include information indicating to which lower layer entity the PDCP entity transmits the PDCP PDU. The PDCP entity may submit the PDCP PDU to only the lower layer entity indicated by the deactivation command.

In each aspect of the present invention, each of the multiple lower layer entities may be a radio link control (RLC) or an LTE-WLAN aggregated adaptation protocol (LWAAP) entity In each aspect of the present invention, the activation or deactivation command may be received using a medium access control (MAC) control element (CE).

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduced.

Also, it is possible to efficiently transmit/receive a small amount of data for smart devices, or efficiently transmit/receive data occurring at a low frequency.

Also, signals in a new radio access technology system can be transmitted/received effectively.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
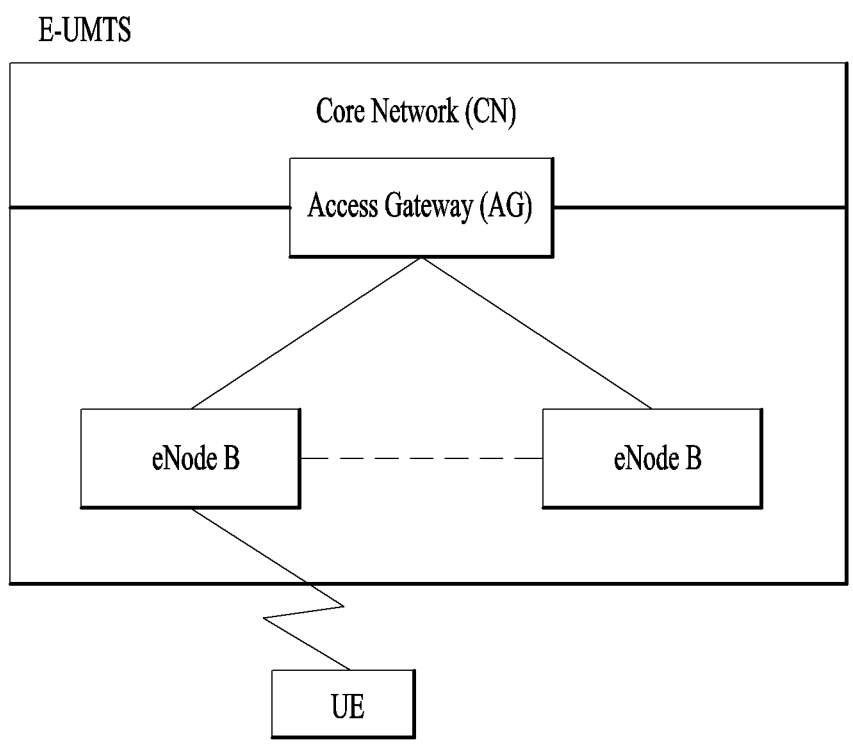
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a base station of the UTRAN is called Node-B, a base station of the E-UTRAN is called eNB, and a base station of a next generation (NextGen) system is called gNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, a EPDCCH (in subframes when configured), a MTC PDCCH (MPDCCH), for an RN with R-PDCCH configured and not suspended, to the R-PDCCH or, for NB-IoT to the narrow-band PDCCH (NPDCCH).

In the present invention, "multi-connectivity" or "MC" means a mode of operation of a UE in RRC_CONNECTED, configured with multiple cell groups. Especially, "dual connectivity" or "DC" means a mode of operation of a UE in RRC_CONNECTED, configured with two cell groups (master cell group and secondary cell group). In DC or MC, each cell group is a group of serving cells associated with a base station, comprising of a PCell or PSCell and optionally one or more SCells. BSs involved in DC or MC for a certain UE may assume two different roles: an eNB/gNB may either act as a master BS or as a secondary BS. In DC a UE is connected to one MeNB/MgNB and one SeNB/MgNB. In MC, a UE is connected to one MeNB/MgNB and one or more SeNBs/SgNBs.

In the present invention, for dual connectivity (DC) operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "G-RNTI" refers to a group RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 38.xxx series may be referenced.

Figure 2:
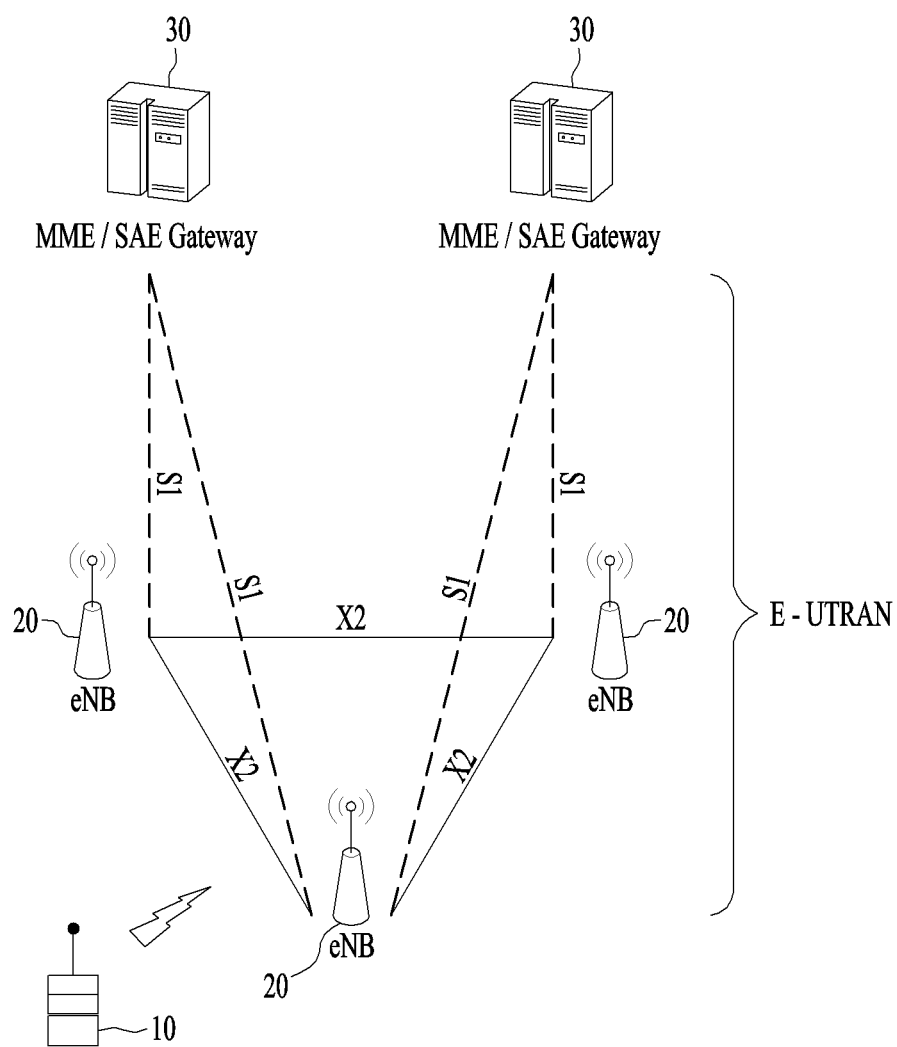
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
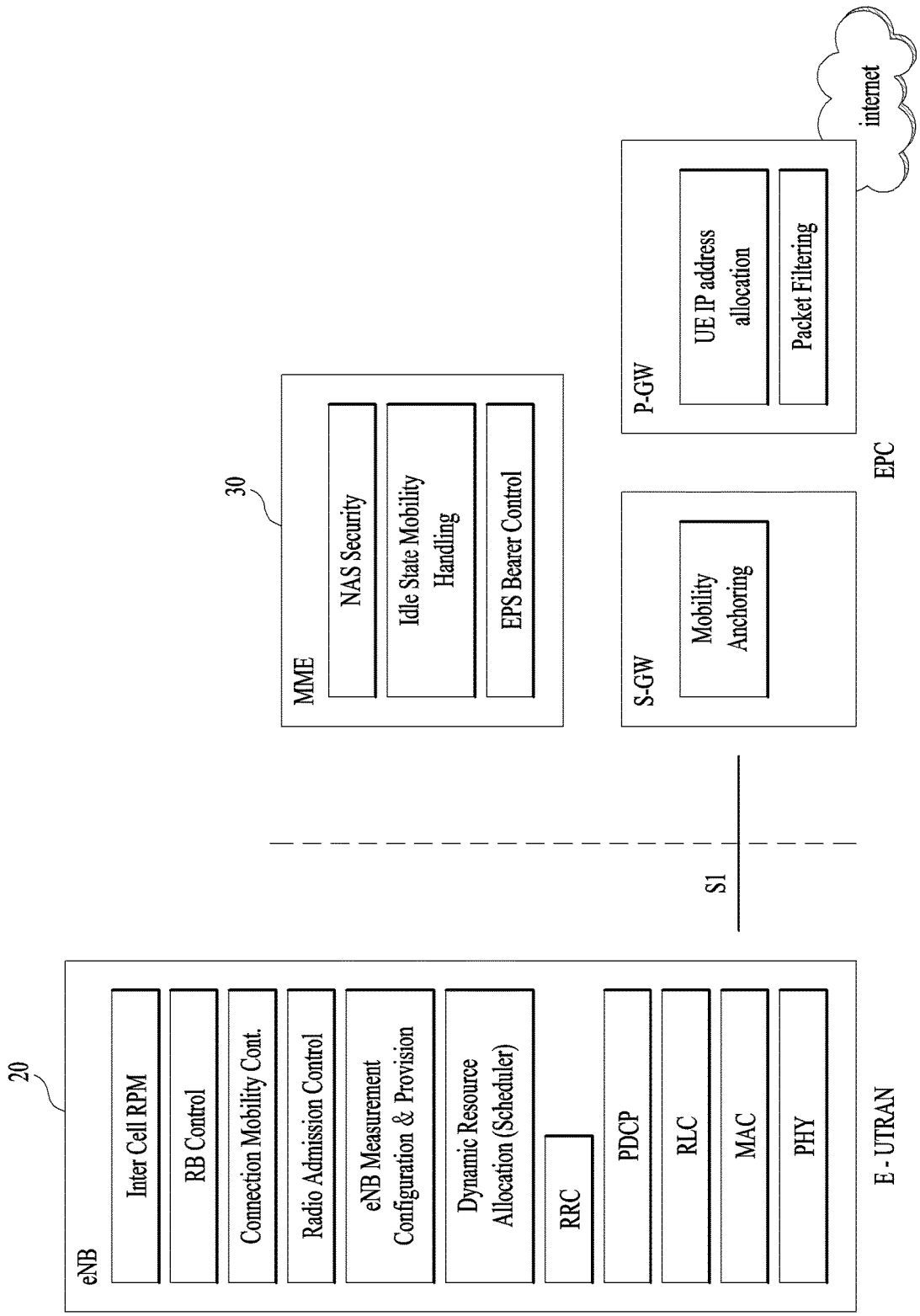
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
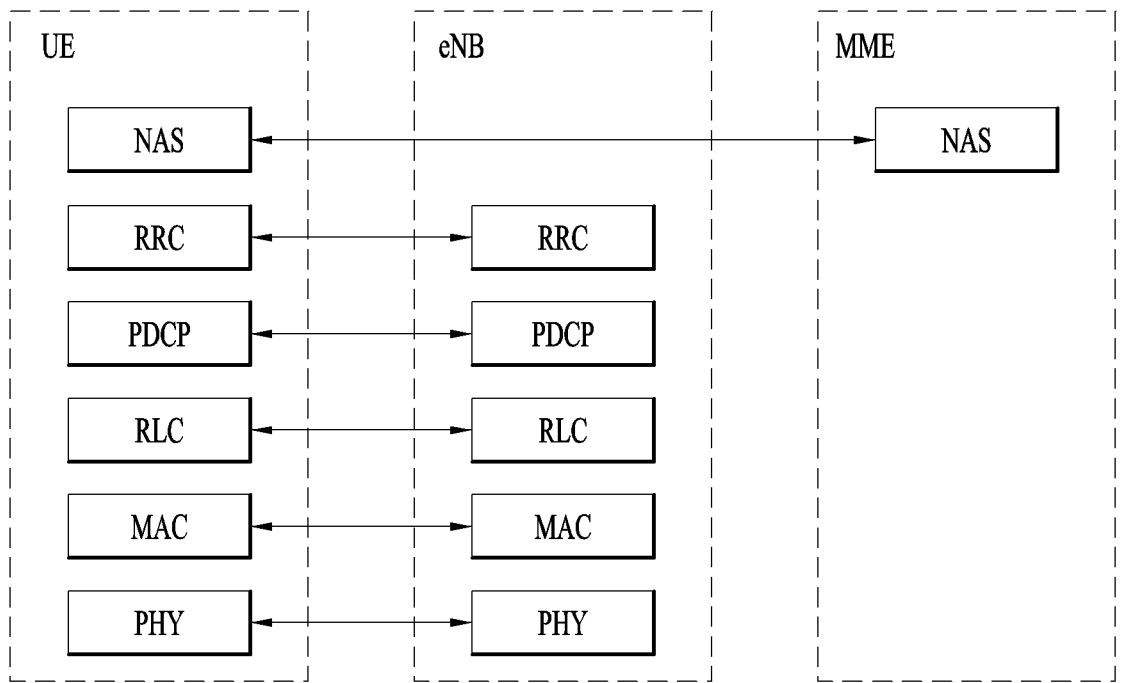
FIG. 4 is a diagram showing a control plane and a user plane of a radio interface protocol between a UE and an E-UTRAN based on a 3GPP radio access network standard.
Figure 4:
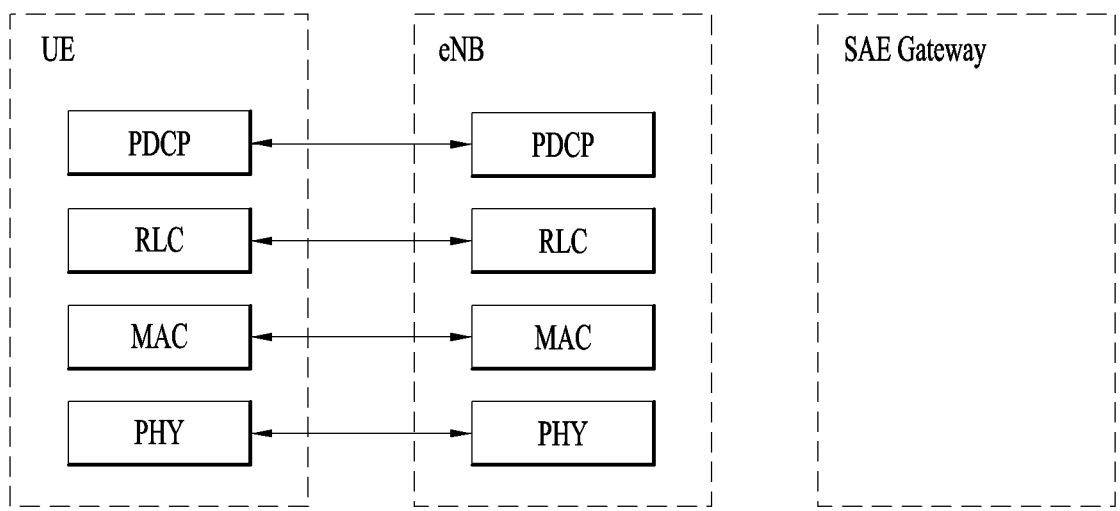

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, reconfiguration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
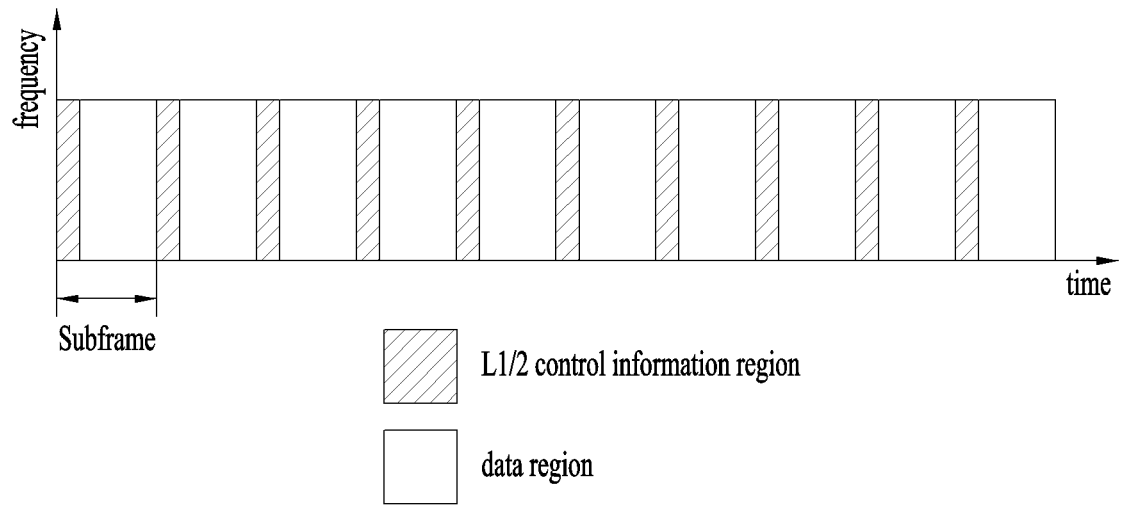
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, an opportunity of transmission of an UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID). The UE having finished initial cell search may perform the random access procedure to complete access to the eNB. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed. After performing the procedure described above, the UE may perform PDCCH/PDSCH reception and PUSCH/PUCCH transmission as a typical procedure of transmission of an uplink/downlink signal.

Figure 6:
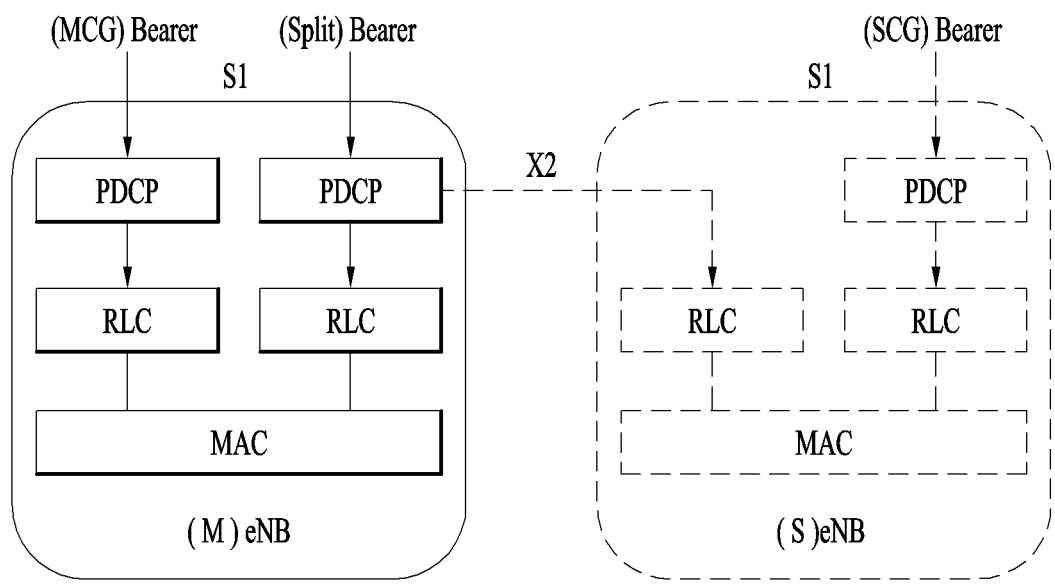
FIG. 6 illustrates a radio protocol architecture in the LTE/LTE-A system.

FIG. 6 illustrates a radio protocol architecture in the LTE/LTE-A system.

Referring to FIG. 6, in view of one eNB, there is 1 PDCP entity and 1 RLC entity configured for 1 radio bearer. In other words, in the LTE/LTE-A system, one RLC entity is connected to one PDCP entity, and used for only one radio bearer.

Meanwhile, E-UTRAN supports Dual Connectivity (DC) operation whereby a multiple Rx/Tx UE in RRC_CONNECTED is configured to utilizee radio resources provided by two distinct schedulers, located in two eNBs connected via a non-ideal backhaul over the X2 interface. The MeNB terminates at least S1-MME, and the SeNB is providing additional radio resources for the UE but is not the MeNB. If UE is configured with DC, the UE is connected to one MeNB and one SeNB, and configured with a master cell group (MCG) and a secondary cell group (SCG). In DC, the radio protocol architecture that a particular bearer uses depends on how the bearer is setup. Three bearer types exist: MCG bearer, SCG bearer and split bearer. The MCG bearer is a bearer whose radio protocol are only located in the MeNB to use MeNB resources only, the SCG bearer is a bearer whose radio protocols are only located in the SeNB to use SeNB resources, and the split bearer is a bearer whose radio protocols are located in both the MeNB and the SeNB to use both MeNB and SeNB resources. Those three bearer types are depicted on FIG. 6. RRC is located in MeNB, and SRBs are always configured as MCG bearer type and therefore only use the radio resources of the MeNB. Similar to the case where a UE is not configured with DC, one RLC entity is connected to one PDCP entity, and used for only one radio bearer even when the UE is configured with DC.

Recently LTE-WLAN aggregation (LWA) operation has been introduced in the LTE/LTE-A system. E-UTRAN supports LWA operation whereby a UE in RRC_CONNECTED is configured by the eNB to utilize radio resources of LTE and WLAN. Two scenarios are supported depending on the backhaul connection between LTE and WLAN:

non-collocated LWA scenario for a non-ideal backhaul;
collocated LWA scenario for an ideal/internal backhaul.

Figure 7:
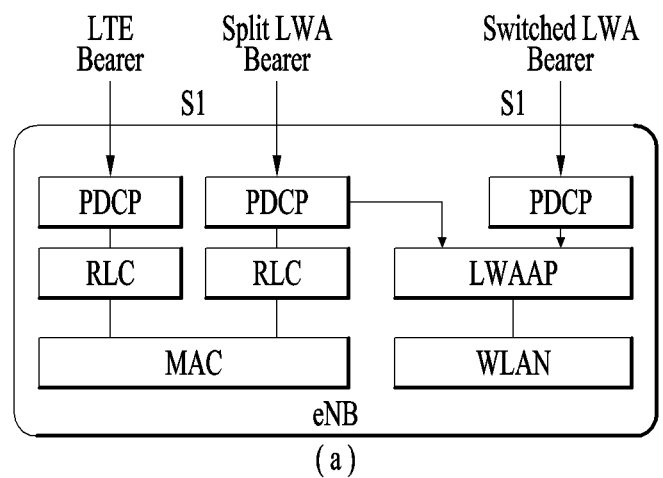
FIG. 7 illustrates bearer types for LWA.
Figure 7:
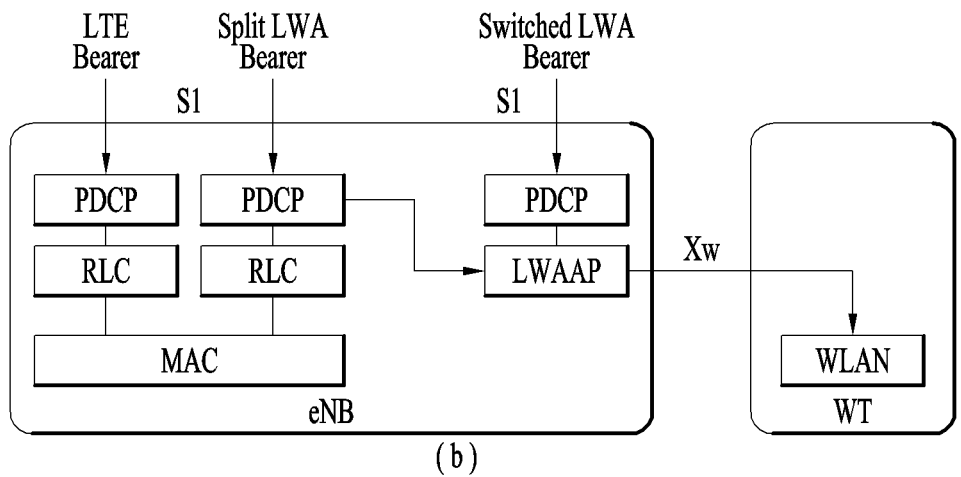

FIG. 7 illustrates bearer types for LWA.

In LWA, the radio protocol architecture that a particular bearer uses depends on the LWA backhaul scenario and how the bearer is set up. Two bearer types exist for LWA: split LWA bearer and switched LWA bearer. Those two bearer types are depicted in FIG. 7(a) for the collocated scenario and on FIG. 7(b) for the non-collocated scenario. The split LWA bearer is a bearer whose radio protocols are located in both the eNB and the WLAN to use both eNB and WLAN radio resources in LWA. The switched LWA bearer is a bearer whose radio protocols are located in both the eNB and the WLAN but uses WLAN radio resources only in LWA.

For PDUs sent over WLAN in LWA operation, the LTE-WLAN Aggregated Adaptation Protocol (LWAAP) entity generates LWA PDU containing a data radio bearer (DRB) identity and the WT uses the LWA EtherType 0x9E65 for forwarding the data to the UE over WLAN. The LWA PDU is a PDU with DRB ID generated by LWAAP entity for transmission over WLAN. The UE uses the LWA EtherType to determine that the received PDU belongs to an LWA bearer and uses the DRB identity to determine to which LWA bearer the PDU belongs to. In the downlink, LWA supports split bearer operation where the PDCP sublayer of the UE supports in-sequence delivery of upper layer PDUs based on the reordering procedure introduced for DC. In the uplink, PDCP PDUs can only be sent via the LTE. The UE supporting LWA may be configured by the eNB to send PDCP status report or LWA PDCP status report, in cases where feedback from WT is not available. Only RLC AM can be configured for the LWA bearer.

The RRC layer is generally in control of the LWAAP configuration. Functions of the LWAAP sublayer are performed by LWAAP entities. For an LWAAP entity configured at the eNB, there is a peer LWAAP entity configured at the UE and vice versa. For all LWA bearers, there is one LWAAP entity in the eNB and one LWAAP entity in the UE. An LWAAP entity receives/delivers LWAAP SDUs from/to upper layers (i.e. PDCP) and sends/receives LWAAP PDUs to/from its peer LWAAP entity via WLAN:

At the eNB, when an LWAAP entity receives an LWAAP SDU from upper layers, it constructs the corresponding LWAAP PDU and delivers it to lower layers;

At the UE, when an LWAAP entity receives an LWAAP PDU from lower layers, it reassembles the corresponding LWAAP SDU and delivers it to upper layers.

An LWAAP entity delivers/receives LWAAP data PDU to/from a lower layer entity.

When receiving an LWAAP data PDU from lower layers, the LWAAP entity in the UE:

identifies the upper layer entity to which the LWAAP SDU is destined based on the DRB ID included in the LWAAP header;

reassembles the LWAAP SDU from the LWAAP data PDU by removing the LWAAP header from the LWAAP data PDU;

delivers the reassembled LWAAP SDU to the upper layer entity identified by the DRB ID.

Figure 8:
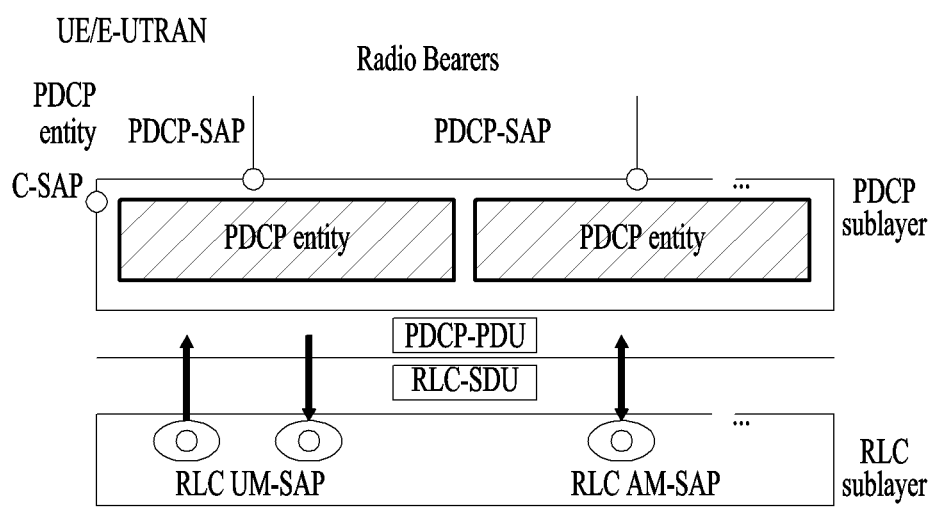
FIG. 8 illustrates an example of one possible structure for the PDCP sublayer.

FIG. 8 illustrates an example of one possible structure for the PDCP sublayer.

Each radio bearer (RB) (i.e. data radio bearer (DRB), sidelink radio bearer (SLRB) and signaling radio bearer (SRB), except for SRB0 and SRB ibis) is associated with one PDCP entity. Each PDCP entity is associated with one or two (one for each direction) RLC entities depending on the RB characteristic (i.e. uni-directional or bi-directional) and RLC mode. For split bearers, each PDCP entity is associated with two AM RLC entities. For LTE-WLAN Aggregation (LWA) bearers, each PDCP entity is associated with an AM RLC entity and the LWAAP entity. The PDCP entities are located in the PDCP sublayer. The PDCP sublayer is configured by upper layers (e.g., RRC layer). The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported.

Every PDCP entity uses at most one ROHC compressor instance and at most one ROHC decompressor instance. A PDCP entity is associated either to the control plane or the user plane depending on which radio bearer it is carrying data for.

Figure 9:
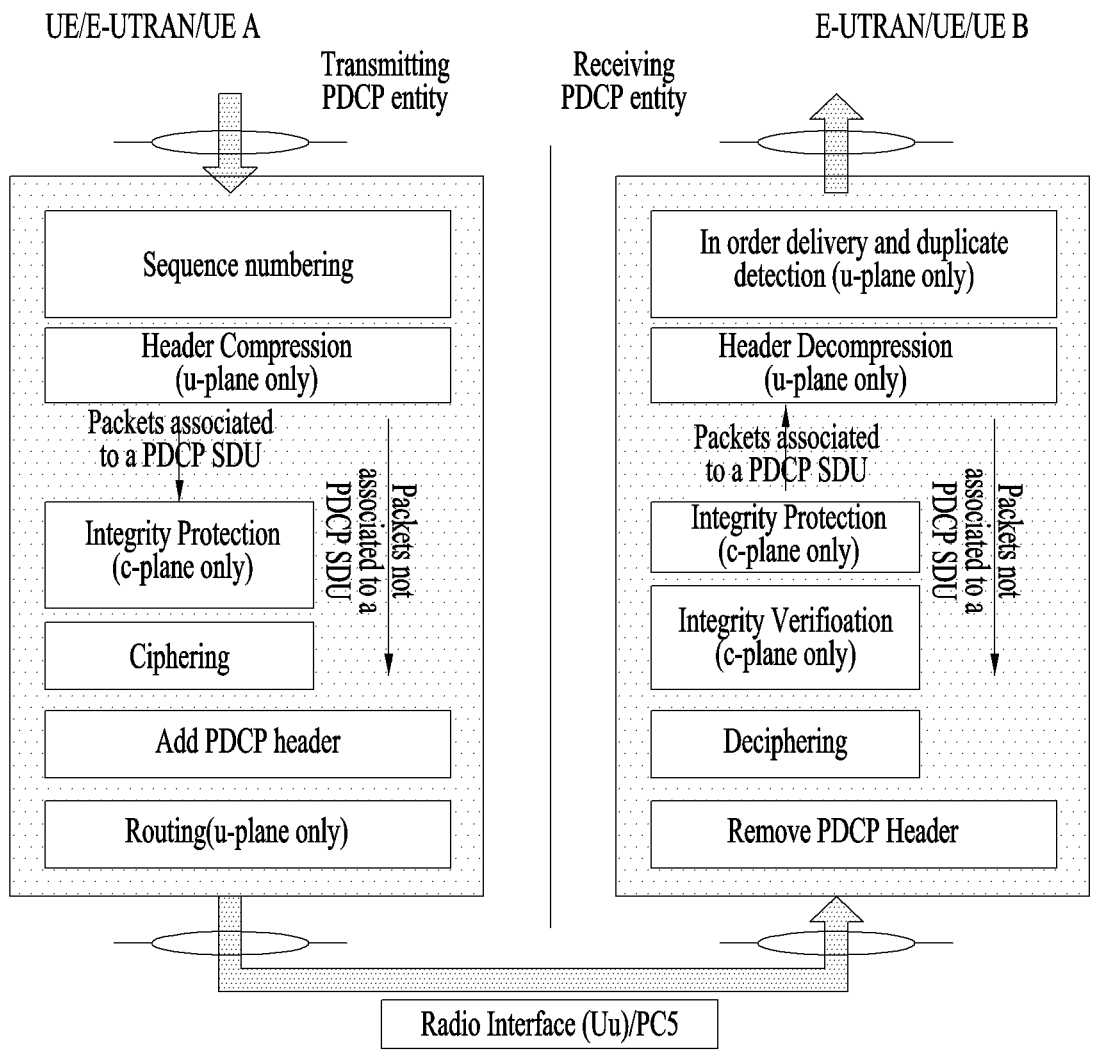
FIG. 9 illustrates the functional view of the PDCP entity for the PDCP sublayer.

FIG. 9 illustrates the functional view of the PDCP entity for the PDCP sublayer.

The PDCP supports the following functions: header compression and decompression of IP data flows using the ROHC protocol; transfer of data (user plane or control plane); maintenance of PDCP SNs; in-sequence delivery of upper layer protocol data units (PDUs) at re-establishment of lower layers; duplicate elimination of lower layer service data units (SDUs) at re-establishment of lower layers for radio bearers mapped on RLC AM; ciphering and deciphering of user plane data and control plane data; integrity protection and integrity verification of control plane data; integrity protection and integrity verification of sidelink one-to-one communication data; for RNs, integrity protection and integrity verification of user plane data; timer based discard; duplicate discarding; and/or for split and LWA bearers, routing and reordering.

The PDCP entities are located in the PDCP sublayer. Several PDCP entities may be defined for a UE. Each PDCP entity carrying user plane data may be configured to use header compression. Each PDCP entity is carrying the data of one radio bearer. Every PDCP entity uses at most one ROHC compressor instance and at most one ROHC decompressor instance.

For split bearers, routing is performed in the transmitting PDCP entity, and reordering is performed in the receiving PDCP entity. When requested by lower layers to submit PDCP PDUs, the transmitting PDCP entity shall:
if ul-DataSplitThreshold is configured and the data available for transmission is larger than or equal to ul-DataSplitThreshold:
submit the PDCP PDUs to either the associated AM RLC entity configured for SCG or the associated AM RLC entity configured for MCG, whichever the PDUs were requested by;
else:
if ul-DataSplitDRB-ViaSCG is set to TRUE by upper layers (e.g. RRC layer):
if the PDUs were requested by the associated lower layers configured for SCG:
submit the PDCP PDUs to the associated AM RLC entity configured for SCG;
else:
if the PDUs were requested by the associated lower layers configured for MCG:
submit the PDCP PDUs to the associated AM RLC entity configured for MCG.

The parameter ul-Data SplitThreshold indicates the threshold value for uplink data split operation, and the parameter ul-DataSplitDRB-ViaSCG indicates whether the UE sends PDCP PDUs via SCG.

For LWA bearers, routing is performed in the transmitting PDCP entity and reordering is performed in the receiving PDCP entity. The transmitting PDCP entity of the UE shall only submit the PDCP PDUs to the associated AM RLC entity.

PDCP provides its services to the RRC and user plane upper layers at the UE or to the relay at the evolved Node B (eNB). The following services are provided by PDCP to upper layers: transfer of user plane data; transfer of control plane data; header compression; ciphering; and/or integrity protection.

A PDCP entity expects the following services from lower layers per RLC entity: acknowledged data transfer service, including indication of successful delivery of PDCP PDUs; unacknowledged data transfer service; in-sequence delivery, except at re-establishment of lower layers; and/or duplicate discarding, except at re-establishment of lower layers.

There are two types of PDCP PDU: PDCP Data PDU and PDCP Control PDU. A PDCP PDU is a bit string that is byte aligned (i.e. multiple of 8 bits) in length.

Figure 10:
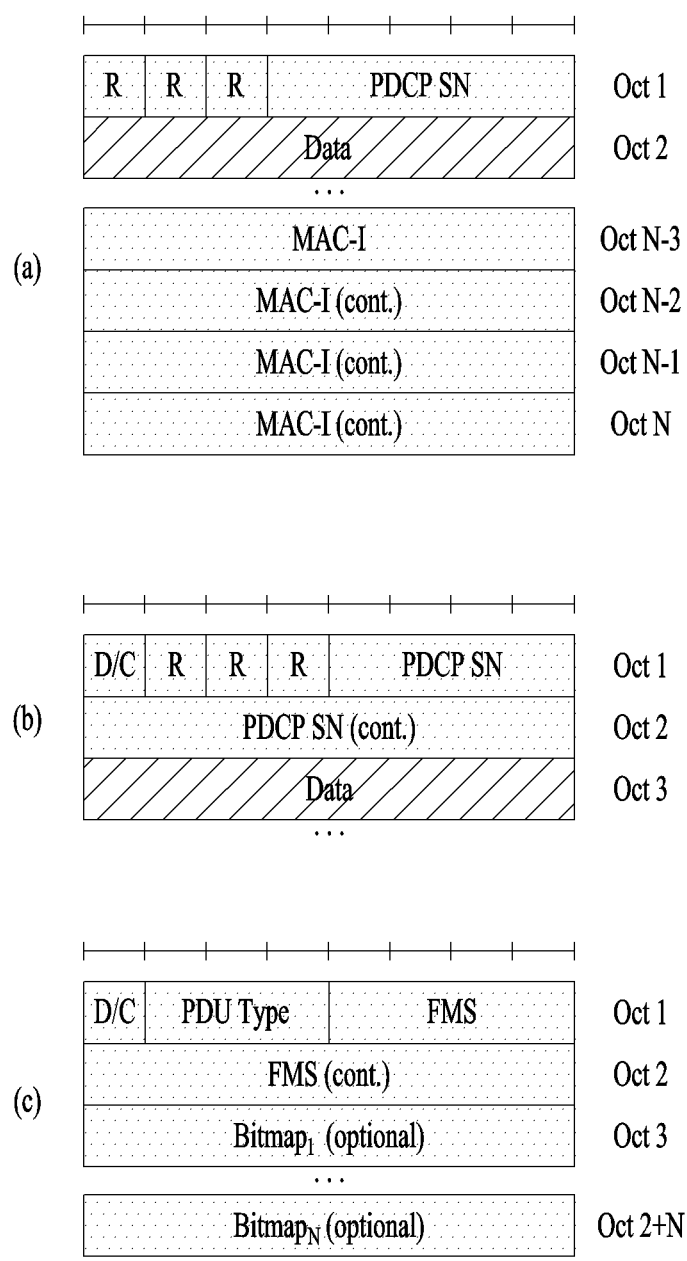
FIG. 10 shows formats of PDCP Data PDU used in the legacy LTE/LTE-A system.

FIG. 10 shows formats of PDCP Data PDU used in the legacy LTE/LTE-A system. FIG. 10($a$) shows the format of the control plane PDCP Data PDU carrying data for control plane SRBs. FIG. 10($b$) shows the format of the user plane PDCP Data PDU when a 12 bit SN length is used. FIG. 10($c$) shows one of the formats of PDCP Control PDU. Especially, FIG. 10($c$) shows the format of the PDCP Control PDU carrying one interspersed ROHC feedback packet. Similar to the format of the PDCP Control PDU shown at FIG. 10($c$), the PDCP Control PDU carrying one PDCP status report includes D/C field and PDP Type field in the PDCP header.

The Data field in the PDCP Data PDU may include either one of the following: uncompressed PDCP SDU (user plane data, or control plane data); or compressed PDCP SDU (user plane data only).

The D/C field indicates whether a corresponding PDCP PDU is a PDCP Control PDU or PDCP Data PDU, as shown in Table 1.

TABLE 1

| Bit | Description |
| --- | --- |
| 0 | Control PDU |
| 1 | Data PDU |

If the D/C field indicates that a corresponding PDCP PDU is a PDCP Control PDU, then the header of the PDCP PDU further contains the PDU type field. The PDCP type field indicates the type of the contents included in the PDCP Control PDU, as shown in Table 2.

TABLE 2

| Bit | Description |
| --- | --- |
| 000 | PDCP status report |
| 001 | Interspersed ROHC feedback packet |
| 010 | LWA status report |
| 011-111 | reserved |

The following Table shows PDCP SDU type used in the legacy LTE system. The SDU Type field (3 bits) in the PDCP header is used to discriminate between IP, ARP and PC5. For PDCP SDU type "Non-IP", a "Non-IP Type" header is included in the SDU by upper layer to indicate the type of non-IP messages carried as specified in TS 3GPPP TS 24.334. The PDCP entity may handle the SDU differently per SDU Type, e.g. header compression is applicable to IP SDU but not ARP SDU and Non-IP SDU.

TABLE 3

| Bit | Description |
| --- | --- |
| 000 | IP |
| 001 | ARP |
| 010 | PC5 Signaling |
| 011 | Non-IP |
| 100-111 | reserved |

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future. Work has started in ITU and 3GPP to develop requirements and specifications for new radio systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for the new RAT (NR) system (also referred to as 5G RAT). It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology." For the 3GPP agreements, terms and/or technology on the NR system associated with the present invention, 3GPP TR 36.842, 3GPP TR 38.801, 3GPP TR 38.804, 3GPP TR 23.779 and 3GPP TS 38.xxx series may be referenced.

In URLLC, packets must be correctly received with ultra-high reliability, which can be 99.999%, within the required latency target. Since the latency target may be as low as 1 ms, existing techniques, such as HARQ, may not be sufficient for ultra-high reliability. Packet duplication can be used to increase the reliability for both the user data and control signaling within the required latency target and can be used instead of link selection. The same techniques can also improve mobility robustness including in challenging scenarios such as high mobility and ultra-dense deployments. During the 3GPP meetings for the NR system, there were discussions on the use of dual connectivity (DC) and multi-connectivity (MC) architectures with packet duplication across multiple links to ensure high reliability such as required to support URLLC. During the 3GPP meetings for the NR system, it was agreed that packet duplication is supported for user plane and control plane in PDCP of NR (i.e. NR-PDCP) and that the PDCP function in the transmitter supports packet duplication and the PDCP function in the receiver supports duplicate packet removal. To this end, in NR, a PDCP at a transmitter needs to be modified to introduce a duplication function. In other words, in NR, the PDCP at the transmitter should be able to duplicate a PDCP PDU and transmit them to multiple RLC entities (or LWAAP entities for LWA case).

Compared to no packet duplication, the packet duplication has above-stated merits. However, it also has problems that it makes more radio resource consumed, compared to no packet duplication, because a transmitter performing the packet duplication transmits a same PDCP PDU over multiple radio links. Therefore, the packet duplication is not always useful considering radio resource consumption. It would be desirable when it is applied for special cases such URLLC transmission or during handover. The present invention proposes a new method to reduce the disadvantageous effects of the packet duplication while maintaining the advantageous effects of it.

In view of this, the present invention proposes applying the packet duplication when it is really needed. To this end, the present invention proposes that a receiver command a transmitter to turn on or off the packet duplication function in PDCP. As the packet duplication is useful only at special conditions, e.g., bad radio conditions, important packet transmission, etc., the receiver may command the transmitter to turn on/off the packet duplication function configured in PDCP. In the present invention, whether to support packet duplication function may be configured per PDCP or radio bearer by RRC signaling (e.g. radio bearer configuration information). Or, it may be predefined in the NR system or standard documents that each PDCP should be always configured with the packet duplication function. In the present invention, even if a radio bearer (RB) or PDCP is configured to support packet duplication, the PDCP at a transmitter does not have to perform packet duplication for all PDCP PDU. The PDCP at the transmitter may perform the packet duplication if there is a command to turn-on the packet duplication for the corresponding PDCP/RB, and does not perform the packet duplication if there is no command to turn-on the packet duplication. Alternatively, the PDCP at the transmitter may perform the packet duplication if there is no command to turn-off the packet duplication for the corresponding PDCP/RB, and does not perform the packet duplication if there is a command to turn-off the packet duplication.

As PDCP or RB is configured by RRC, the packet duplication may be configured per PDCP or RB by RRC (signaling). In the present invention, enabling/disabling the packet duplication for PDCP/RB may be signaled or controlled by a lower layer (e.g. MAC, PDCP) than RRC, in order for the packet duplication function to be enabled or disabled more quickly.

For example, in the present invention, PDCP of a receiver may command PDCP of a transmitter to turn on/off the packet duplication function. In this case, a new layer-2 PDU (e.g. PDCP PDU) may be introduced for the PDCP of the receiver to command the PDCP of the transmitter to turn on/off the packet duplication function in PDCP.

Figure 11:
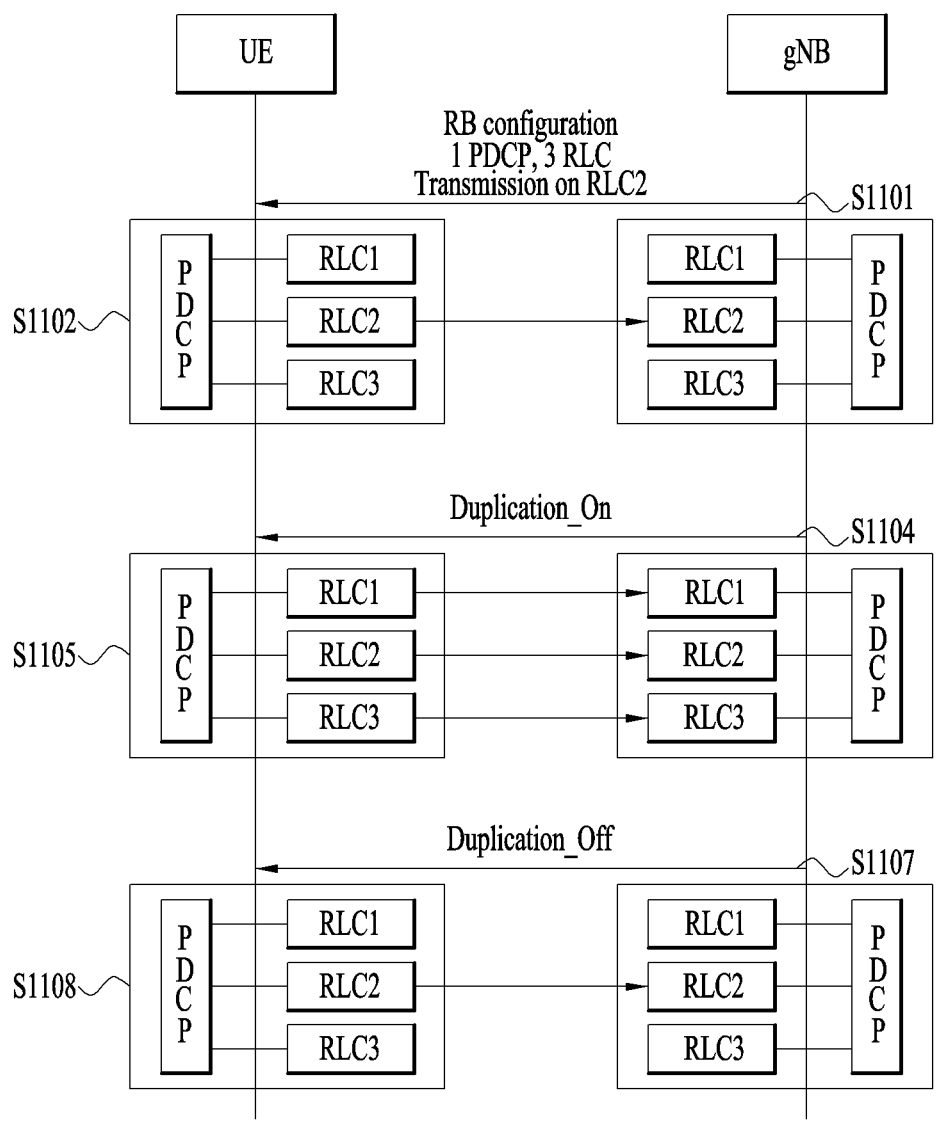
FIG. 11 illustrates another example of a packet transmission according to the present invention.

FIG. 11 illustrates another example of a packet transmission according to the present invention.

Referring FIG. 11, a receiver (e.g. gNB) may transmit RB configuration information (e.g. RadioResourceConfigDedicated used to setup/modify/release RBs) to a transmitter (e.g. UE) (S1101). The RB configuration information may include configuration information on 1 PDCP entity and 3 RLC entities associated with an RB. The UE may configure 1 PDCP and 3 RLC entities for the RB based on the RB configuration information. In other words, the UE may associate the RB with 1 PDCP entity and 3 RLC entities based on the RB configuration information. The PDCP entity for the RB is associated with the 3 RLC entities. The PDCP entity (i.e. transmitting PDCP entity) may submits PDCP PDU(s) to one lower layer entity (S1102) (e.g. one RLC) unless the packet duplication function is enabled. The RB configuration information may include information indicating to which lower layer entity PDCP PDUs are submitted (while the packet duplication function is not enabled).

The transmitter (e.g. UE in FIG. 11) receives a "Duplication_On" command (i.e. activation command for the packet duplication function) from the receiver (e.g. gNB in FIG. 11), the transmitter starts to apply the packet duplication function for the PDCP. In other words, in the present invention, a PDCP entity (PDCP transmitter) at a transmitting side starts to apply the packet duplication function when the packet duplication function for the PDCP entity or RB is enabled.

For example, when the PDCP transmitter (i.e. PDCP entity at the transmitter) receives a "Duplication_On" command from the PDCP receiver (S1104), the PDCP transmitter starts to duplicate PDCP PDUs from then on, and transmits duplicated PDCP PDUs to multiple lower layer entities to which the PDCP entity is connected, one for each lower layer entity (S1105). Therefore, if the packet duplication function is enabled in a PDCP entity, multiple lower layer entities associated with the PDCP entity respectively transmit corresponding lower layer PDUs containing the same packet submitted from the PDCP entity.

When the PDCP transmitter receives a "Duplication_Off" command (i.e. deactivation command for the packet duplication function) from the PDCP receiver (S1107), the PDCP transmitter stops duplicating PDCP PDUs from then on, and transmits PDCP PDUs to only one lower layer entity among multiple lower layer entities (S1108). Only one lower layer entity would transmit a lower layer PDU containing a PDCP PDU submitted from an associated PDCP entity. The only one lower layer entity to which the PDCP transmitter submits PDCP PDUs may be indicated by the RB configuration information. For example, referring to FIG. 11, if the RB configuration information includes information indicating transmission on RLC2 as a primary RLC, the PDCP entity may submit PDCP PDUs to only RLC2 among RLC1, RLC2 and RLC 3 associated with the PDCP entity.

Figure 12:
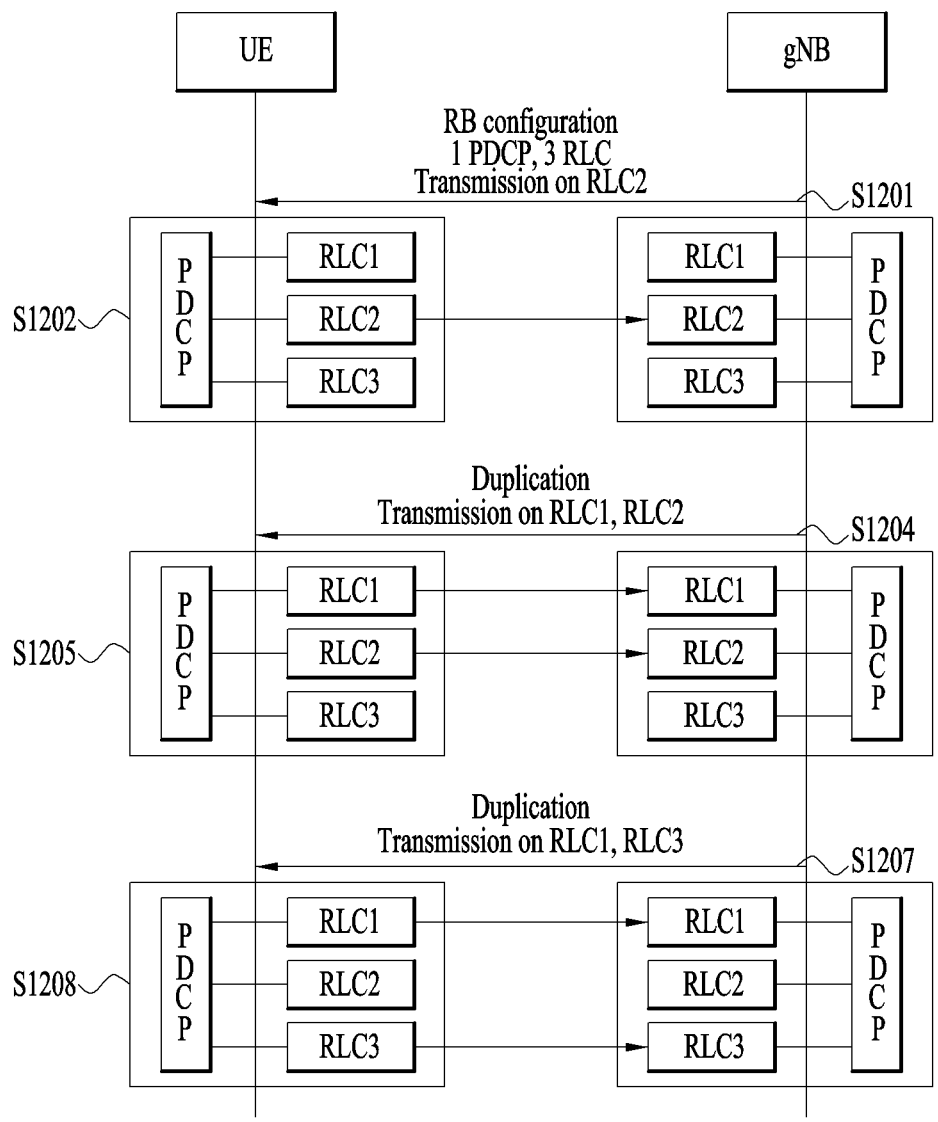
FIG. 12 illustrates another example of a packet transmission according to the present invention.

FIG. 12 illustrates another example of a packet transmission according to the present invention.

Referring FIG. 12, a receiver (e.g. gNB) may transmit RB configuration information to a transmitter (e.g. UE) (S1201). The RB configuration information may include configuration information on 1 PDCP entity and 3 RLC entities associated with an RB. The UE may configure 1 PDCP and 3 RLC entities for the RB based on the RB configuration information. In other words, the UE may associate the RB with 1 PDCP entity and 3 RLC entities based on the RB configuration information. The PDCP entity for the RB is associated with the 3 RLC entities. The PDCP entity (i.e. transmitting PDCP entity) may submits PDCP PDU(s) to one lower layer entity (S1202) (e.g. one RLC) unless the packet duplication function is enabled. The RB configuration information may include information indicating to which lower layer entity PDCP PDUs are submitted (while the packet duplication function is not enabled).

In the present invention, it is possible that the receiver commands the transmitter to transmit duplicated PDCP PDUs to only part of a multiple lower layer entities associated with the PDCP entity of the transmitter. The PDCP entity submits its PDCP PDUs to only the part of the multiple lower layer entities indicated by the receiver.

For example, it is possible that the PDCP receiver commands the PDCP transmitter to transmit duplicated PDCP PDUs to only part of the multiple lower layer entities (S1204, S1207). In FIG. 12, the Duplication_On command may contain information indicating to which lower layer entities the PDCP transmitter should transmit duplicated PDCP PDUs (S1204). The Duplication_Off command may also contain information indicating to which lower layer entities the PDCP transmitter should stop transmitting duplicated PDCP PDUs (S1207). It is possible that only one type of Duplication command (e.g. either Duplication_On or Duplication_Off) is defined including lower layer indicator to indicate to which lower layer entities the duplicated PDCP PDUs are transmitted.

The PDCP entity submits its PDCP PDUs to only the lower layer entities indicated by the receiver (S1205, S1208).

In the present invention, the Duplication_On and Duplication_Off commands may be transmitted via PDCP Control PDU. They may be defined in one type of PDCP Control PDU or separate types of PDCP Control PDUs. An indicator may be included in the PDCP PDU header to indicate whether the PDCP PDU contains Duplication_On and/or Duplication_Off command.

In the present invention, the PDCP transmitter may be located in UE, eNB, gNB, or other wireless network/device. The PDCP receiver may be located in UE, eNB, gNB, or other wireless network/device. The lower layer entity may be RLC or LWAAP or other layer 2 entity.

Although the present invention has been described by exemplifying PDCP, it is possible to apply the present invention to other layer 2, e.g., RLC or MAC. In other words, a MAC PDU or RLC PDU may be used as the layer-2 PDU containing a duplication on or off command of the present invention. For example, an MAC CE may be used to turn on or off the packet duplication in PDCP.

If the duplication function is introduced in RLC, the Duplication_On/Off command may transmitted via RLC Control PDU, and if the duplication function is introduced in MAC, the Duplication_On/Off command is transmitted via MAC CE. The Duplication On/Off command may be transmitted via RRC message.

In the present invention, stopping or starting packet duplication function is controlled by signaling of a layer (e.g. PDCP, MAC, or RLC) lower than RRC, whereby the packet duplication function can be started or stopped more quickly and with less signaling overhead compared to RRC reconfiguration.

Figure 13:
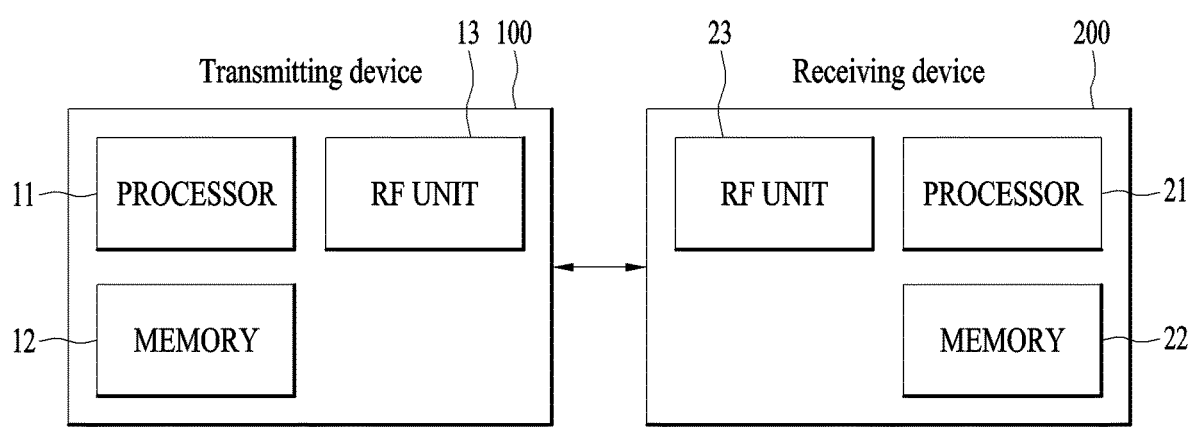
FIG. 13 is a block diagram illustrating elements of a transmitting device 100 and a receiving device 200 for implementing the present invention.

FIG. 13 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include Nr (where Nr is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

A processor of a transmitting device controls an RF unit of the transmitting device to receive radio bearer (RB) configuration information for a RB. The RB configuration information includes configuration information for a PDCP entity and multiple lower layer entities (e.g. RLC entities) associated with the PDCP entity.

In an example of the present invention, if an activation command for a packet duplication function of the PDCP entity for the RB is received, the processor submits, at the PDCP entity, a PDCP PDU to each of the multiple lower layer entities. The processor may control the RF unit to transmit the PDCP PDU of each of the multiple lower layer entities to receiving device(s). If a deactivation command for the packet duplication function is received, the processor submit, at the PDCP entity, the PDCP PDU to a single one of the multiple lower layer entities.

The processor may control the RF unit to transmit the PDCP PDU of the single one of the multiple lower layer entities to receiving device(s). In another example of the present invention, the processor may control the RF unit to receive a command indicating to which lower layer entity the PDCP entity submits PDCP PDUs. The processor submit, at the PDCP entity, a PDCP PDU to each lower layer entity indicated by the command. The processor may control the RF unit to transmit, from each lower layer entity to which the PDCP PDU is submitted, the PDCP PDU.

The transmitting device may be a user equipment or a base station. The activation or deactivation command may be received from a receiving device. The receiving device may be a base station or another user equipment. Each of the multiple lower layer entities may be a radio link control (RLC) or an LTE-WLAN aggregated adaptation protocol (LWAAP) entity. The activation or deactivation command may be received using a medium access control (MAC) control element (CE).

The RB configuration information may include information indicating to which lower layer entity the PDCP entity transmits the PDCP PDU. In this case, the processor submits, at the PDCP entity, the PDCP PDU to only the lower layer entity indicated by the information.

The activation command may include information indicating to which lower layer entity the PDCP entity transmits the PDCP PDU. In this case, the processor submits, at the PDCP entity, the PDCP PDU to only the lower layer entity indicated by the activation command.

The deactivation command may include information indicating to which lower layer entity the PDCP entity transmits the PDCP PDU. In this case, the processor submits, at the PDCP entity, the PDCP PDU to only the lower layer entity indicated by the deactivation command.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method of transmitting, by a first device, data units in a wireless communication system, the method comprising:
receiving, by the first device, configuration information related to (i) a packet data convergence protocol (PDCP) entity of the first device and (ii) a first radio link control (RLC) entity that is associated with the PDCP entity, wherein the PDCP entity is associated with a plurality of RLC entities of the first device that comprise the first RLC entity;
generating, at the PDCP entity, a PDCP protocol data unit (PDU);
based on receiving, by the first device, a Layer-2 activation command to activate a packet duplication function of the PDCP entity:
performing duplication of the PDCP PDU, and
submitting, by the PDCP entity to each of the plurality of RLC entities, a duplication performed PDCP PDU; and
based on receiving, by the first device, a Layer-2 deactivation command to deactivate the packet duplication function of the PDCP entity:
submitting, by the PDCP entity to one of the plurality of RLC entities, the PDCP PDU.

2. The method of claim 1, further comprising:
based on receiving, by the first device, the Layer-2 activation command:
transmitting, by each of the plurality of RLC entities, the duplication performed PDCP PDU; and
based on receiving, by the first device, the Layer-2 deactivation command:
transmitting, by the one of the plurality of RLC entities, the PDCP PDU.

3. The method of claim 1, wherein submitting, to one of the plurality of RLC entities, the PDCP PDU, comprises:
submitting the PDCP PDU to the first RLC entity or a second RLC entity among the plurality of RLC entities.

4. The method of claim 1, wherein receiving, by the first device, the Layer-2 activation command comprises: receiving a non-radio resource control (RRC), Layer-2 activation command, and
wherein receiving, by the first device, the Layer-2 deactivation command comprises: receiving a non-RRC, Layer-2 deactivation command.

5. The method of claim 1, wherein receiving, by the first device, the Layer-2 activation command comprises: receiving the Layer-2 activation command through a medium access control (MAC) control element (CE), and
wherein receiving, by the first device, the Layer-2 deactivation command comprises: receiving the Layer-2 deactivation command through the MAC CE.

6. The method of claim 1, wherein the configuration information comprises radio bearer (RB) configuration information for an RB.

7. The method of claim 1, wherein the first device is a user equipment (UE), and
wherein the first device receives the Layer-2 activation command or the Layer-2 deactivation command from a base station (BS) or from another UE.

8. A wireless communication device comprising:
at least one radio frequency (RF) transceiver;
at least one processor; and
at least one computer memory having instructions stored thereon that, when executed, cause the at least one processor to perform operations comprising:
receiving, by the wireless communication device, configuration information related to (i) a packet data convergence protocol (PDCP) entity of the wireless communication device and (ii) a first radio link control (RLC) entity that is associated with the PDCP entity, wherein the PDCP entity is associated with a plurality of RLC entities of the wireless communication device that comprise the first RLC entity;
generating, at the PDCP entity, a PDCP protocol data unit (PDU);
based on receiving, by the wireless communication device, a Layer-2 activation command to activate a packet duplication function of the PDCP entity:
performing duplication of the PDCP PDU; and
submitting, by the PDCP entity to each of a plurality of RLC entities, a duplication performed PDCP PDU; and
based on receiving, by the wireless communication device, a Layer-2 deactivation command to deactivate the packet duplication function of the PDCP entity:
submitting, by the PDCP entity to one of the plurality of RLC entities, the PDCP PDU.

9. The wireless communication device of claim 8, wherein the operations further comprise:
based on receiving, by the wireless communication device, the Layer-2 activation command:
transmitting, by each of the plurality of RLC entities, the duplication performed PDCP PDU; and
based on receiving, by the wireless communication device, the Layer-2 deactivation command:
transmitting, by the one of the plurality of RLC entities, the PDCP PDU.

10. The wireless communication device of claim 8, wherein submitting, to one of the plurality of RLC entities, the PDCP PDU, comprises:
submitting the PDCP PDU to the first RLC entity or a second RLC entity among the plurality of RLC entities.

11. The wireless communication device of claim 8, wherein receiving, by the wireless communication device, the Layer-2 activation command comprises: receiving a non-radio resource control (RRC), Layer-2 activation command, and
wherein receiving, by the wireless communication device, the Layer-2 deactivation command comprises: receiving a non-RRC, Layer-2 deactivation command.

12. The wireless communication device of claim 8, wherein receiving, by the wireless communication device, the Layer-2 activation command comprises: receiving the Layer-2 activation command through a medium access control (MAC) control element (CE), and
wherein receiving, by the wireless communication device, the Layer-2 deactivation command comprises: receiving the Layer-2 deactivation command through the MAC CE.

13. The wireless communication device of claim 8, wherein the configuration information comprises radio bearer (RB) configuration information for an RB.

14. The wireless communication device of claim 8, wherein the wireless communication device is a user equipment (UE), and
wherein receiving the Layer-2 activation command or the Layer-2 deactivation command comprises receiving the Layer-2 activation command or the Layer-2 deactivation command from a base station (BS) or from another UE.

15. An apparatus configured to control a wireless communication device, the apparatus comprising:
   at least one processor; and
   at least one computer memory having instructions stored thereon that, when executed, cause the at least one processor to perform operations comprising:
      receiving, by the wireless communication device, configuration information related to (i) a packet data convergence protocol (PDCP) entity of the wireless communication device and (ii) a first radio link control (RLC) entity that is associated with the PDCP entity, wherein the PDCP entity is associated with a plurality of RLC entities of the wireless communication device that comprise the first RLC entity;
      generating, at the PDCP entity, a PDCP protocol data unit (PDU);
      based on receiving, by the wireless communication device, a Layer-2 activation command to activate a packet duplication function of the PDCP entity:
         performing duplication of the PDCP PDU; and
         submitting, by the PDCP entity to each of a plurality of RLC entities, a duplication performed PDCP PDU; and
      based on receiving, by the wireless communication device, a Layer-2 deactivation command to deactivate the packet duplication function of the PDCP entity:
         submitting, by the PDCP entity to one of the plurality of RLC entities, the PDCP PDU.

16. The apparatus of claim 15, wherein the operations further comprise:
   based on receiving, by the wireless communication device, the Layer-2 activation command:
      transmitting, by each of the plurality of RLC entities, the duplication performed PDCP PDU; and
   based on receiving, by the wireless communication device, the Layer-2 deactivation command:
      transmitting, by the one of the plurality of RLC entities, the PDCP PDU.

17. The apparatus of claim 15, wherein submitting, to one of the plurality of RLC entities, the PDCP PDU, comprises:
   submitting the PDCP PDU to the first RLC entity or a second RLC entity among the plurality of RLC entities.

18. The apparatus of claim 15, wherein receiving, by the wireless communication device, the Layer-2 activation command comprises: receiving a non-radio resource control (RRC), Layer-2 activation command, and
   wherein receiving, by the wireless communication device, the Layer-2 deactivation command comprises: receiving a non-RRC, Layer-2 deactivation command.

19. The apparatus of claim 15, wherein receiving, by the wireless communication device, the Layer-2 activation command comprises: receiving the Layer-2 activation command through a medium access control (MAC) control element (CE), and
   wherein receiving, by the wireless communication device, the Layer-2 deactivation command comprises: receiving the Layer-2 deactivation command through the MAC CE.

20. The apparatus of claim 15, wherein the configuration information comprises radio bearer (RB) configuration information for an RB.

* * * * *